(12) United States Patent
Pichler et al.

(10) Patent No.: US 12,011,115 B2
(45) Date of Patent: Jun. 18, 2024

(54) FOOD PROCESSING APPARATUS AND A METHOD OF OPERATING THE SAME

(71) Applicant: KONINKLIJKE PHILIPS N.V., Eindhoven (NL)

(72) Inventors: Mario Pichler, Feldkirchen Bei Graz (AT); Dieter Johann Maier, Klagenfurt (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 904 days.

(21) Appl. No.: 17/044,927

(22) PCT Filed: Apr. 12, 2019

(86) PCT No.: PCT/EP2019/059407
§ 371 (c)(1),
(2) Date: Oct. 2, 2020

(87) PCT Pub. No.: WO2019/201766
PCT Pub. Date: Oct. 24, 2019

(65) Prior Publication Data
US 2021/0153693 A1 May 27, 2021

(30) Foreign Application Priority Data

Apr. 17, 2018 (EP) .................................. 18167674

(51) Int. Cl.
*A47J 43/07* (2006.01)
*A47J 43/046* (2006.01)

(52) U.S. Cl.
CPC ......... *A47J 43/0772* (2013.01); *A47J 43/046* (2013.01); *A47J 43/075* (2013.01); *A47J 2043/0733* (2013.01); *A47J 43/0761* (2013.01)

(58) Field of Classification Search
CPC ....... A23N 1/02; A47J 43/046; A47J 43/0465; A47J 43/075; A47J 43/0761; A47J 2043/0733; A47J 19/025
See application file for complete search history.

(56) References Cited

U.S. PATENT DOCUMENTS

| 5,435,237 A | 7/1995 | Huang |
| 6,817,750 B1 | 11/2004 | Sands |

(Continued)

FOREIGN PATENT DOCUMENTS

| CN | 102905587 A | 1/2013 |
| CN | 103720385 | 4/2014 |

(Continued)

OTHER PUBLICATIONS

International Search Report and Written Opinion dated Jun. 23, 2019 for International Application No. PCT/EP2019/059407 Filed Apr. 12, 2019.

*Primary Examiner* — Reginald Alexander
(74) *Attorney, Agent, or Firm* — Maschoff Brennan (57) ABSTRACT

There is provided an apparatus (10) for processing food stuff. The apparatus (10) comprises a container (110) for receiving a food stuff; a food processing unit (120) for processing the food stuff in the container; a force sensor (130) for measuring an operation parameter, and a control unit (140) for operating the food processing unit (120) based on measurements received from the sensor. The sensor is furthermore configured to measure an interaction with the apparatus by a user. The control unit is configured to receive measurements of the user interaction from the sensor (130) and process the received measurements to determine if a predetermined user interaction or a predetermined user interaction pattern corresponding to a user input command has been performed by the user.

14 Claims, 4 Drawing Sheets

(56) References Cited

U.S. PATENT DOCUMENTS

| | | | |
|---|---|---|---|
| 9,084,508 B2 | 7/2015 | Sanford | |
| 10,136,763 B2* | 11/2018 | Heijman | A61C 17/221 |
| 2004/0099656 A1 | 5/2004 | Sauter | |
| 2015/0257586 A1 | 9/2015 | DiNucci et al. | |
| 2016/0241653 A1 | 8/2016 | Ciepiel | |
| 2018/0272300 A1* | 9/2018 | Wallace | B01F 35/2117 |
| 2019/0001288 A1* | 1/2019 | Ciepiel | B01F 35/2209 |
| 2021/0378206 A1* | 12/2021 | Feder | A01J 25/06 |

FOREIGN PATENT DOCUMENTS

| | | |
|---|---|---|
| CN | 105395033 A | 3/2016 |
| CN | 205782651 U | 12/2016 |
| CN | 106998957 A | 8/2017 |
| CN | 106998966 A | 8/2017 |
| EP | 3251567 | 12/2017 |
| WO | 2015197274 | 12/2015 |
| WO | 2016/070232 | 5/2016 |

\* cited by examiner

FOOD PROCESSING APPARATUS AND A METHOD OF OPERATING THE SAME

CROSS REFERENCE TO RELATED APPLICATIONS

This application is the U.S. National Phase application under 35 U.S.C. § 371 of International Application No. PCT/EP2019/059407 filed Apr. 12, 2019, which claims the benefit of European Patent Application Number 18167674.3 filed Apr. 17, 2018. These applications are hereby incorporated by reference herein.

TECHNICAL FIELD OF THE INVENTION

The invention relates to a food processing apparatus and a method of operating the same. In particular, the invention relates to an apparatus for processing food stuff that allows intuitive user control and a method of operating the same.

BACKGROUND TO THE INVENTION

Many domestic kitchen appliances have user interfaces comprising components such as switches, buttons, displays, knobs, and indication lights. With different user interface components a user can power on/off the kitchen appliance, start/stop different cooking processes, and change a setting of the cooking process (e.g. speed, cooking temperature, cooking time). The indication lights at the user interface can provide feedback of the status of the kitchen appliance, i.e. power on/off. These types of user interface components are often not intuitive to users. In some cases, a user may find it confusing to operate the kitchen appliance when faced with a user interface which includes many different buttons and knobs. Moreover, mechanical user interface elements such as a push buttons and rotary knobs can be easily affected and damaged by dirt, water, or food stuff. The unevenness of the surface of the kitchen appliance due to the presence of these types of mechanical user interface elements can also increase the difficulty to clean the kitchen appliance.

There are also many domestic kitchen appliances that are equipped with touch displays which can be used for receiving user input. For some of these kitchen appliances, the cooking process can be controlled by a user by tapping the displayed elements (e.g. a virtual button). Touch displays are however very sensitive to dirt and moisture. During the food preparation and cooking process, food stuff can splash around and adhere to the surface of the touch display. Sometimes, the user's hands and fingers may be coated with water and grease from the food stuff during food preparation, which would make it difficult for them to accurately input the correct command through the touch display. In some cases when guided cooking is used, i.e. when a recipe is displayed at the kitchen appliance or a display at a connected smart device to guide a user through the cooking process, the user has to enter input at the kitchen appliance or the smart device to proceed to the next step in the recipe. If this input is not interpreted correctly, the sequence of the cooking process may be disrupted.

There is thus a need for an improved apparatus for processing food stuff that allows users to provide input in a straightforward and intuitive way.

EP 3 251 567 discloses a food blender with an adaptable blade, so that the food processing results can be adapted. A sensor is used to monitor conditions within the food processing chamber. A user can provide input by means of a separate user interface.

SUMMARY OF THE INVENTION

As noted above, a limitation with existing kitchen apparatuses is that they do not provide an easy way for users to enter a command when their hands might be covered in foodstuff or their inputs may be undetected or misinterpreted. It would thus be valuable to have an apparatus for processing food stuff and a method of operating the same that addresses the existing problems.

Therefore, according to the invention, there is provided an apparatus for processing food stuff comprising:
 a container for receiving a food stuff;
 a food processing unit for processing the food stuff in the container;
 a force sensor for measuring an operation parameter; and
 a control unit for operating the food processing unit based on measurements received from the force sensor,
 characterized in that the force sensor is configured to measure, in addition to the operating parameter:
 an interaction with the apparatus by a user when the user applies a force on the apparatus;
 wherein the control unit is configured to:
 receive measurements of the user interaction from the force sensor; and
 process the received measurements to:
  determine if a predetermined user interaction or a predetermined user interaction pattern corresponding to a user input command has been performed by the user; and
  control the food processing unit in dependence on the determined user input command.

In this apparatus, a force sensor is present for measuring an operating parameter, by which is meant information about the food stuff or information about the setting or configuration of the apparatus itself. This operating parameter is of interest for the control of the apparatus, for example for automatically setting a cooking time or temperature, or for starting or stopping the cooking process. The invention makes use of this sensor for additionally monitoring user interaction, in the form of a force applied on the apparatus, for example when the user presses down or against on the apparatus. This application of force by the user can be conducted with dirty hands and without touching the apparatus with the fingers. For example, the user may press down on a lid of the apparatus with the back of the hand or with the elbows.

The user can simply perform one of the interactions with the apparatus, as described above, without having to ensure that his hands are free of dirt, grease or moisture. This interaction is then measured by the sensor and interpreted by the control unit. As the sensor is present in the apparatus anyway, the solution can be implemented without additional hardware costs. It only requires a suitable program and/or recognition algorithm, to enable the control unit to interpret from the measured user interaction if and what user input command has been given. Depending on the available sensor type, different user interactions or interaction patterns may be measurable/detectable, as described above, thus providing ample design freedom to associate a certain user input command with a suitable user interaction, that is, most suitable and/or intuitive for the given situation.

The force sensor for example comprises a weight sensor and the operating parameter may then comprise a food weight. Thus, the term "force sensor" is intended to cover a weight sensor (i.e. a sensor which measures downward force) or a force sensor which may measure a non-downward force such to detect a force exerted laterally against the apparatus.

The force sensor may comprise a lid closure sensor, and the operating parameter then comprises a lid closure condition.

In some embodiments, processing the received measurements may comprise matching the received measurements with a predetermined user interaction or a predetermined user interaction pattern to identify a user input command corresponding to the predetermined user interaction or predetermined user interaction pattern.

In some embodiments, matching the received measurements with a predetermined user interaction or a predetermined user interaction pattern may comprise determining whether the measurements exceed a predetermined threshold value.

In some embodiments, the user input command may correspond to an operation to be performed by at least one of the control unit, the apparatus, and an external device.

In some embodiments, the operation may comprise at least one of: powering on/off the apparatus; changing an operation parameter of the apparatus such as for instance a time setting, a temperature setting, a speed setting; changing a program of the apparatus; proceeding to a next step in a program of the apparatus or a user cooking guide; pausing or restarting an operation; adding or altering food ingredients, and confirming presence of a user.

In some embodiments, the apparatus may further comprise a base unit for supporting the container, wherein the sensor may be integrated in the base unit or between the base unit and the container.

In some embodiments, the control unit is further configured to process the received measurements to determine a weight of the food stuff in the container.

In some embodiments, there is further provided an external device, wherein the external device comprises a control unit and a communication unit, and the communication unit of the external device is configured to receive the user input command, and the control unit of the external device is arranged to perform an operation at the external device based on the received user input command from the apparatus.

In some embodiments, there is provided a method of operating an apparatus for processing food stuff comprising: measuring an interaction with the apparatus by a user using a force sensor in the apparatus that is otherwise used for measuring an operation parameter; receiving, in a control unit of the apparatus, measurements of the user interaction when the user applies a force on the apparatus; processing, in a control unit of the apparatus, the received measurements to determine if a determined user interaction or a predetermined user interaction pattern corresponding to a user input command has been performed by the user; and controlling the food processing unit in dependence on the determined user input command.

In some embodiments, the method may further comprise processing, in the control unit of the apparatus, the received measurements to determine if a predetermined user interaction corresponding to closing of a covering element has been performed by the user.

In some embodiments, the method may further comprise processing, in the control unit of the apparatus, the received measurements to determine a weight of the food stuff in the container.

In some embodiments, processing the received measurements may comprise matching the received measurements with a predetermined user interaction or a predetermined user interaction pattern to identify a user input command corresponding to the predetermined user interaction or predetermined user interaction pattern.

In some embodiments, matching the received measurements with a predetermined user interaction or a predetermined user interaction pattern may comprise determining whether the measurements exceed a predetermined threshold value.

In some embodiments, the method may further comprise measuring a force applied to the apparatus by the user as an interaction.

In some embodiments, there is provided a computer program product comprising a computer readable medium having computer readable code embodied therein, the computer readable code being configured such that, on execution by a suitable computer, processor or control unit, the computer, processor or control unit is caused to perform the method according to the third aspect.

According to the embodiments described above, the limitations of existing apparatuses and methods are addressed. In particular, according to the above-described aspects and embodiments, it is possible for users to operate the apparatus during a cooking process without having to ensure that their hands are free of dirt, grease, or moisture, in the manner described above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

As noted above, there is provided an improved apparatus and a method of operating the same which addresses the existing problems.

Figure 1:
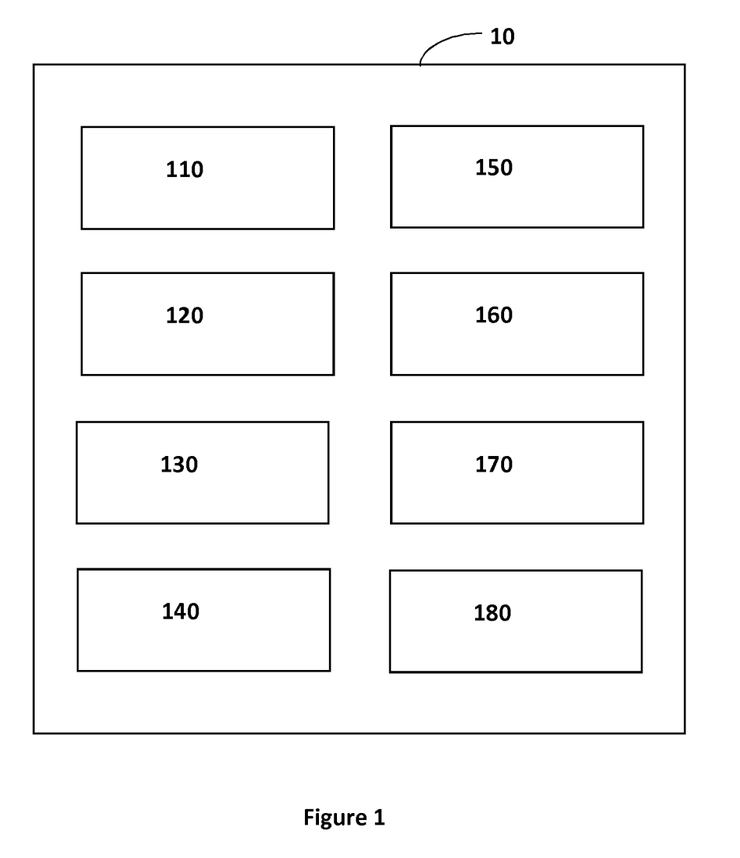
FIG. 1 is a block diagram of an apparatus for processing food stuff according to an embodiment.

FIG. 1 shows a block diagram of an apparatus 10 according to an embodiment that is used for processing food stuff. In some embodiments, the apparatus 10 may be a blender, a food processor, a steamer, an airbased fryer, a toaster, a slow cooker, etc. It will be appreciated that the apparatus 10 can be any apparatus that comprises a food processing function, such as cooking, frying, heating, blending, stirring, mixing, grinding, etc.

With reference to FIG. 1, the apparatus 10 comprises a container 110 for receiving a food stuff, a food processing unit 120 for processing the food stuff in the container, a sensor 130 for measuring an interaction with the apparatus by a user and a control unit 140 for controlling operation of the apparatus 10. The illustrated embodiment further comprises a communication unit 150, a display unit 160, a base unit 170 for supporting the container 110, and a memory unit 180. In some embodiments, one or more of the units 150, 160, 170, 180 may be omitted.

The container 110 can be made of any material or combination of materials, preferably a transparent material so as to allow a user to observe the food processing operation and a status of the food stuff placed inside the container 110 during use of the apparatus 10. In some embodiments, the container 110 can comprise another material which is not transparent, such as stainless steel.

Although not illustrated in FIG. 1, in some embodiments, the apparatus 10 can comprise a covering element for covering the container 110 to confine the food stuff within. The covering element may be provided in the form of a drawer or a lid that is removable from the container 110 or a hinged lid, or a door. In some embodiments, a lock mechanism may be provided so as to secure the covering element at the container 110 during use of the apparatus 10.

Moreover, in some embodiments, the container 110 may be configured to be detachably placed on or mounted onto the base unit 170 such that it is fixed to the base unit 170 during use of the apparatus 10. The container 110 may be removable from the base unit 170, e.g. for purposes of entering or removing foodstuff, for exchanging the container for another one, for cleaning purposes, etc.

In some embodiments, the food processing unit 120 may comprise at least one of a cutting element, a stirring element, and a heating element. In some embodiments, the food processing unit 120 may be located inside the container 110 such that food stuff placed inside the container 100 may be processed directly by the food processing unit 120.

As described above, the sensor 130 is configured to measure an interaction with the apparatus 10 by the user. In particular, the sensor 130 measures a force. In some embodiments, the sensor 130 may for instance comprise a weighing scale which may be integrated in the apparatus 10 or be provided separately from the other components of the apparatus 10. In some embodiments, the sensor 130 may comprise a switch element that is activated by user interaction with the apparatus, for instance when the user presses on a portion of the apparatus (other than the switch element itself) with a certain force. In some embodiments, the sensor 130 may comprise a combination of a spring element and a switch element, wherein the spring element and the switch element may be configured such that the switch element is only activated when the user interaction with the apparatus meets a certain condition, for instance when a force exerted by the user on the apparatus exceeds a certain threshold value. In some embodiments, the sensor 130 may be integrated in the base unit 170. In other embodiments, the sensor 130 may be integrated between the container 110 and the base unit 170. In other embodiments, the sensor 130 may be located separate from the base unit 170. The sensor 130 may be connected to the control unit 140 wirelessly or via a wired connection.

The user interaction is an application of force by the user on the apparatus 10. Thus, the sensor 130 comprises a force sensor for measuring a force applied by the user to the apparatus 10. The applied force may be applied by the user on the apparatus as a whole or on a specific component of the apparatus 10. For example, in some embodiments where the apparatus 10 comprises a covering element, the sensor 130 may be configured to measure a force (over time) applied to the covering element. In some embodiments, the measurements from the sensor 130 may show the measured force over time.

The control unit 140 is configured to receive from the sensor 130 the measurements of the user interaction and process the measurements in order to determine if a predetermined user interaction or a predetermined user interaction pattern has been performed by the user corresponding to a user input command.

The control unit 140 can be implemented in numerous ways, with software and/or hardware, to perform the various functions described herein. The control unit 140 may comprise one or more microprocessors or digital signal processor (DSPs) that may be programmed using software or computer program code to perform the required functions and/or to control components of the control unit 140 to effect the required functions. The control unit 140 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

In various implementations, the control unit 140 may be associated with or comprise one or more memory units 180 that comprise any type of memory, such as cache or system memory including volatile and non-volatile computer memory such as random access memory (RAM) static RAM (SRAM), dynamic RAM (DRAM), read-only memory (ROM), programmable ROM (PROM), erasable PROM (EPROM), and electrically erasable PROM (EEPROM). The control unit 140 or associated memory unit 180 can also be used for storing program code that can be executed by a processor in the control unit 140 to perform the method described herein. In some embodiments, the memory unit 180 can store template messages or content for messages that can be used when generating messages according to the method described below.

In some embodiments where the apparatus 10 comprises a covering element, the control unit 140 may be configured to process the received measurements in order to determine if a predetermined interaction corresponding to closing of the covering element has been performed by the user.

In some embodiments, the control unit 140 may be further configured to process the received measurements to determine a weight of the food stuff in the container.

In some embodiments, the control unit 140 may be configured to match the received measurements with a predetermined user interaction or a predetermined user interaction pattern to identify a user input command corresponding to the predetermined user interaction or predetermined user interaction pattern. In these embodiments, matching the received measurements with a predetermined user interaction or a predetermined user interaction pattern may comprise determining whether the measurements exceed a certain threshold value.

For example, the control unit 140 may be configured to process the force measurements in order to determine at least one of: a magnitude of the force, a time duration of the force applied, a number of times a force is applied within a predetermined time, and a time period between an applied force and a consecutive applied force. In these embodiments, a predetermined user interaction may be a force with a magnitude which exceeds a certain threshold value. In this case, when the force measured by the sensor 130 exceeds this threshold value (i.e. matching the predetermined user interaction), the control unit 140 determines that the predetermined user interaction corresponding to a user input command has been performed by the user. A more detailed example of determining whether a predetermined user interaction corresponding to a user input command has been performed is provided in the description below relating to FIG. 5.

Furthermore, in some embodiments a user input command may correspond to an operation to be performed by at least one of: the control unit 140, the apparatus 10, and an external device. For example, in some embodiments, the predetermined user interaction may be a force with a magnitude which exceeds a certain threshold value, and in these embodiments this predetermined user interaction may correspond to a user input command which in turn may correspond to a specific operation, e.g. to power on/off the apparatus 10. In this case, when the control unit 140 determines that the force applied by the user exceeds the threshold value, it can then determine this as a user input command to power on or off the apparatus 10 and subsequently perform this operation. In some embodiments, the user input command may relate to changing a status of the apparatus, such as powering on/off the apparatus 10, changing a setting or operation parameter of the apparatus, for instance a time setting, a temperature setting and/or a speed setting of the apparatus 10, changing a program of the apparatus 10, proceeding to a next step in a user cooking guide, pausing/restarting an operation, adding/altering ingredients and/or confirming presence of a user. Two or more of these user input commands may have a respective associated predetermined interaction or predetermined interaction pattern.

In some embodiments, a time setting of the apparatus 10 may be a time duration during which the control unit 140 controls the food processing unit 120 to operate, e.g. perform cutting/blending for 1 minute. In some embodiments, a time setting of the apparatus 10 may be a time at which the apparatus 10 is powered on/off automatically. In some embodiments, a temperature setting of the apparatus 10 may be a setting for a temperature within the container 110 of the apparatus 10. In some embodiments, a speed setting of the apparatus 10 may be a speed at which the control unit 140 controls the food processing unit 120 to operate, e.g. perform cutting/blending at 500 rpm. In some embodiments, a program of the apparatus 10 may comprise a set of time settings and/or temperature settings and/or speed settings for operating the food processing unit 120. In some embodiments, user cooking guides comprises a plurality of steps that can be displayed to the user via a display unit (e.g. at the apparatus 10 or at an external device), each step corresponding to a step in a recipe for preparing a food item.

In some embodiments, the apparatus 10 can comprise a display unit 160. The display unit 160 may be configured to display a setting and/or status of the apparatus, e.g. a current on/off status of the apparatus 10. In some embodiments, the display unit 160 may be a touch screen display unit which can receive further user input. In some embodiments, the display unit 160 may be part of a user interface.

In some embodiments, a plurality of user interactions and/or user interaction patterns along with corresponding user input commands and corresponding operations may be stored in the memory unit 180, such that the control unit 140 can retrieve and compare at least one of the plurality of user interactions or user interaction patterns with a measured user interaction to determine whether the measured interaction corresponds to a user input command.

Also, according to some embodiments, a setting and/or status of the apparatus 10 may be stored in the memory unit 180 of the apparatus 10. Similarly, in some embodiments, the control unit 140 can be configured to control the memory unit 180 to store at least one of a plurality of time settings of the apparatus 10, a plurality of temperature settings of the apparatus 10, a plurality of speed settings of the apparatus 10, a plurality of programs of the apparatus 10, a plurality of steps in a user cooking guide, and a plurality of user cooking guides for use in the method described herein.

Alternatively or in addition, in some embodiments, a setting and/or status of the apparatus, such as a current on/off status of the apparatus 10, may be stored in a memory external to (i.e. separate to or remote from) the apparatus 10, such as a memory of another apparatus or device. The memory unit 180 of the apparatus 10 can be configured to store program code that can be executed by the control unit 140 to perform the method described herein. In some embodiments, alternatively or in addition to information described above, the memory unit 180 of the apparatus 10 can be used to store other data (or information) acquired or made by the control unit 140 of the apparatus 10 or acquired from any interfaces, memories or devices that are external to the apparatus 10. The control unit 140 of the apparatus 10 may be configured to control the memory unit 180 to store such data (or information).

In some embodiments, the apparatus 10 may comprise a user interface. The user interface of the apparatus 10 may be for use in providing a user of the apparatus 10 with information resulting from the method described herein. The control unit 140 of the apparatus 10 may be configured to control the user interface to provide the information resulting from the method described herein. The user interface as referred to herein may be any user interface that enables the rendering (or output or display) of data (or information) to a user of the apparatus 10. The display unit 160 as described above may be a part of the user interface of the apparatus 10 in some embodiments.

Alternatively or in addition, a user interface as referred to herein may be any user interface that enables a user of the apparatus 10 to provide additional user input, interact with and/or control the apparatus 10. For example, a user interface as referred to herein can comprise one or more switches, one or more buttons, a keypad, a keyboard, a touch screen or an application (for example, on a tablet or smartphone), one or more microphones or any other audio component, or any other user interface component, or combination of user interface components.

The communication unit (or circuitry) 150 may be configured to enable the apparatus 10 to communicate with any interfaces, memories and devices that are internal or external to the apparatus 10. The communication unit 150 may communicate with any interfaces, memories and devices wirelessly or via a wired connection. For example, the communication unit 150 may communicate with the memory unit 180 of the apparatus 10 or any other memory wirelessly or via a wired connection. Similarly, the communication unit 150 may communicate with a user interface (not shown in FIG. 1) of the apparatus 10 or any other user interface wirelessly or via a wired connection.

It will be appreciated that FIG. 1 only shows the components required to illustrate this aspect of the apparatus and, in a practical implementation, the apparatus 10 may comprise additional components to those shown. For example, the apparatus 10 may comprise a battery or other power supply for powering the apparatus 10 or means for connecting the apparatus 100 to a mains power supply.

Figure 2:
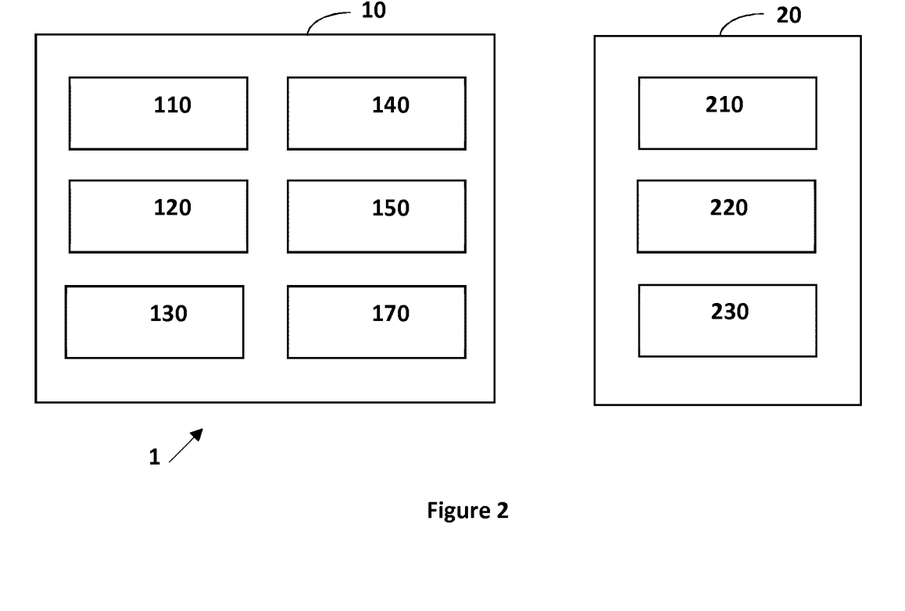
FIG. 2 is a block diagram of a system including a food processing apparatus according to an embodiment.

As mentioned above, in some embodiments, the communication unit 150 may communicate with other devices wirelessly or via a wired connection. FIG. 2 shows a block diagram of a system 1 including an apparatus 10 for processing food stuff, such as one described in relation to FIG. 1, and an external device 20, in which the communication unit 150 of the apparatus 10 is configured to at least transmit information from the apparatus 10 to the external device 20. In some embodiments, the external device 20 may be a smart phone, a tablet computer, a laptop, a desktop computer, etc.

In the embodiment illustrated in FIG. 2, the apparatus 10 comprises a container 110, a food processing unit 120, a sensor 130, a control unit 140 for controlling operation of the apparatus 10, a communication unit 150, and a base unit 170 for supporting the container 110. For the sake of brevity, explanation relating to the container 110, the food processing unit 120, the sensor 130, the base unit 170, and the control unit 140 is omitted as these components function in the same way as described in relation to the apparatus 10 illustrated in FIG. 1.

The external device 20 comprises a communication unit 210, a memory 220, and a display unit 230. The communication unit 210 of the external device 20 is configured to receive information from the communication unit 150 of the apparatus 10. For example, the communication unit 210 of the external device may receive information relating to a setting and/or status of the apparatus 10. In these embodiments, the display unit 230 of the external device 20 may be configured to display the received information. Therefore, in some embodiments where the apparatus 10 is not equipped with display capabilities (e.g. a display unit 160), information relating to the apparatus 10 and or the food processing operation of the apparatus 10 can be shown to the user through the display unit 230 at the external device 20.

In some embodiments, the communication unit 150 of the apparatus 10 may be further configured to receive information from the external device 20. In these embodiments, the communication unit 210 of the external device 20 may be configured to transmit information. For example, the communication unit 210 of the external device 20 may be configured to transmit a user input command to the communication unit 150 of the apparatus 10 to stop an operation of the food processing unit 120 of the apparatus 10 when a last step of a user cooking guide stored in the memory 220 of the external device 20 is reached. When the communication unit 150 of the apparatus 10 receives this user input command from the external device 20, the control unit 140 can control the food processing unit 120 to stop its operation.

It will be appreciated that FIG. 2 only shows the components required to illustrate this aspect of the system and, in a practical implementation, the system 1, the apparatus 10, and/or the external device 20 may comprise additional components to those shown. For example, the external device 20 may comprise a battery or other power supply for powering the external device 20 or means for connecting the external device 20 to a mains power supply.

Figure 3:
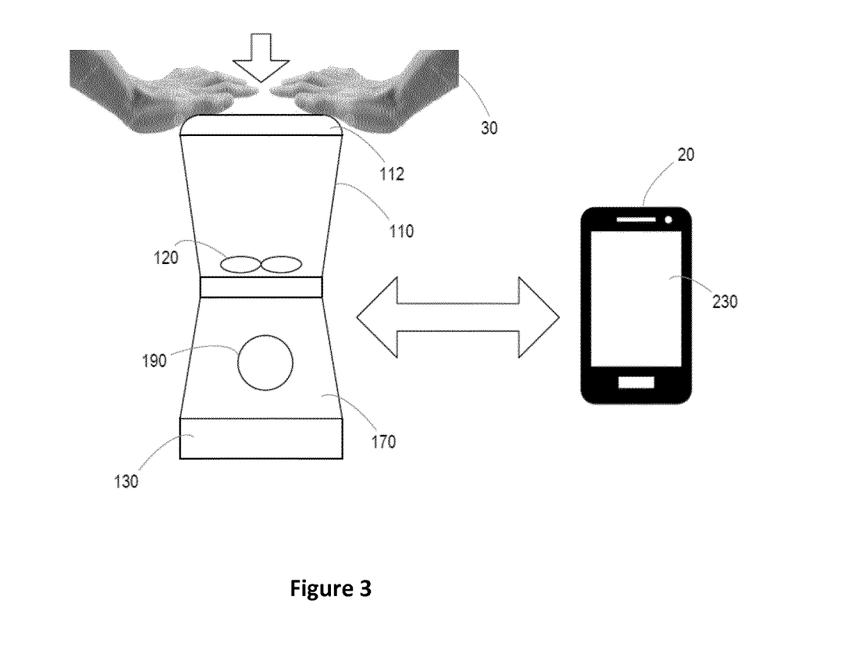
FIG. 3 shows an implementation of a system comprising an apparatus for processing food stuff according to an embodiment.

An implementation of the system including an apparatus for processing food stuff according to an embodiment is shown in FIG. 3. In this implementation, the apparatus 10 in the system 1 is a blender comprising a container 110 for receiving a food stuff, and the container 110 is provided with a covering element 112 in the form of a detachable or hinged lid. In some embodiments, the covering element 112 may be attached to the container 110 with a hinge mechanism such that the covering element 112 can be opened to allow the user to put food stuff into the container and closed to secure the food stuff within the container 110, without being completely detached from the container 110.

The food processing unit 120 is provided in a form of a cutting element that is located inside the container 110, such that food stuff placed inside the container 110 can be processed by the food processing unit 120. The container 110 can be configured to be detachably mounted on a base unit 170 of the apparatus 10. In this embodiment, an actuation element 190 is provided at the base unit 170 in the form of a knob, which allows the user to power on or off the apparatus 10.

The apparatus 10 further comprises a force sensor 130 provided in a form of a weighing scale located at a bottom of the apparatus 10, specifically integrated at a bottom of the base unit 170, so as to measure a force applied by a user 30 to the apparatus 10. Alternatively, in some embodiments, the sensor 130 may be separate from the container 110 and/or the base unit 1170 but connected to the control unit wirelessly or via a wired connection.

Although not illustrated in FIG. 3, the apparatus 10 further comprises a control unit configured to receive force measurements from the sensor 130 and process the received force measurements so as to determine if a predetermined user interaction or a predetermined user interaction pattern corresponding to a user input command has been performed by the user 30. Examples of predetermined user interactions or predetermined user interaction patterns are described in relation to FIGS. 5 and 6.

In some embodiments, the control unit may be further configured to identify an operation corresponding to the user input command which corresponds to a predetermined user interaction or a predetermined user interaction pattern. For example, in some embodiments, the predetermined user interaction may be a force magnitude exceeding a certain threshold value, and in these embodiments this predetermined user interaction may correspond to a specific user input command to perform an operation at the apparatus 10, e.g. to toggle or change a time/temperature/speed setting of the apparatus 10. In this case, when the control unit 140 determines that the applied force by the user 30 exceeds the threshold value, it can then identify this as a user input command to toggle or change a time/temperature/speed setting of the apparatus 10.

The system 1 further comprises an external device 20. In this embodiment, the external device 20 is a smart phone. In some embodiments, the external device 20 may be other types of devices such as a tablet or computer. The smart phone in this embodiment may be installed with a mobile application for guided cooking. The mobile application may include a plurality of user cooking guides each corresponding to a recipe, wherein each of the plurality of user cooking guides comprises a plurality of steps. The smart phone comprises a display unit 230 which in this embodiment is a touch display screen. However, it will be appreciated that in some embodiments the display unit 230 of the external device in the system may be provided in a different form.

Although not illustrated in FIG. 3, the apparatus 10 comprises a communication unit configured to transmit information to an external device 20. In some embodiments, the communication unit may be further configured to receive information from the external device 20. Detailed explanation of the communication unit of the apparatus 10 is omitted as it will be appreciated that the communication unit operates in a similar manner to that described in relation to FIG. 1.

There is therefore provided a system 1 in which the user 30 can control an operation of the food processing unit 120 of the apparatus 10 by pushing down on the apparatus 10 to apply a force. In addition, the display unit 230 of the external device allows the user to view a setting and/or a status of the apparatus 10.

Figure 4:
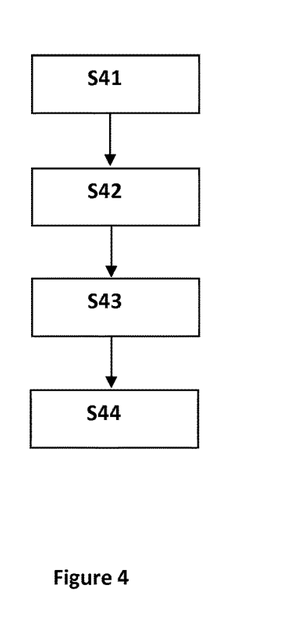
FIG. 4 is a flow chart illustrating an exemplary method for operating an apparatus for processing food stuff according to an embodiment.

The flow chart in FIG. 4 illustrates a method for operating the apparatus 10 according to the invention. This method can be implemented by the control unit 140 of the apparatus 10, and it will be appreciated in some embodiments the apparatus 10 can comprise computer program code for enabling the control unit 140 to perform the method.

In the first step, S41, the sensor 130 measures an interaction with the apparatus 10 by a user. The user interaction is a force applied by a user to the apparatus 10.

After measuring an interaction with the apparatus 10 by the user, the method proceeds to the next steps S42 and S43 in which the measurements of the user interaction is received at the control unit 140 and the control unit 140 processes the received measurements so as to determine if a predetermined user interaction or a predetermined user interaction pattern corresponding to a user input command has been performed by the user. For example, in some embodiments where the user interaction is a force applied by a user, the control unit 140 may process the measurements and determine at least one of: a magnitude of a force applied by the user, a time duration of a force applied by the user, a number of times a force is applied by the user within a predetermined time period, and a time period between an applied force and a consecutive applied force.

In some embodiments, the processing step at S43 includes matching the received measurements with a predetermined user interaction or a predetermined user interaction pattern to identify a user input command corresponding to the predetermined user interaction or predetermined user interaction pattern. In these embodiments, matching the received measurements with a predetermined user interaction or a predetermined user interaction pattern may comprise determining whether the measurements exceed a certain threshold value. Examples of how the received measurements are used to determine if a predetermined user interaction or a predetermined user interaction pattern corresponding to a user input command has been performed are provided in the description passages relating to FIGS. 5 and 6.

In step S44, an operation based on results of the processing step S43 is performed. This operation may be performed by at least one of the control unit 140, the apparatus 10, and an external device. For example, in some embodiments where the apparatus 10 is connected to an external device, performing step S44 may include transmitting the user input command (which for example may correspond to proceeding to a next step in a user cooking guide stored at the external device) by the communication unit 150 of the apparatus 10 to the external device.

In some embodiments where the apparatus 10 is not connected to an external device 20 or does not comprise a communication unit 150, performing step S44 may include operating the food proceeding unit 120, and/or changing a setting and/or status of the apparatus 10. For example, if the user input command corresponds to an operation to change a speed setting of the apparatus 10 and the food processing unit 120 comprises a cutting element, the control unit 140 can be configured to control the cutting element of the food proceeding unit 120 based on the changed speed setting.

Thus, in this method, the user can control the operation of the apparatus 10 by performing a user interaction with the apparatus such as applying a force on the apparatus 10 as a whole, without having to handle switches or buttons or other types of user interface components, such as a touch display.

Figure 5:
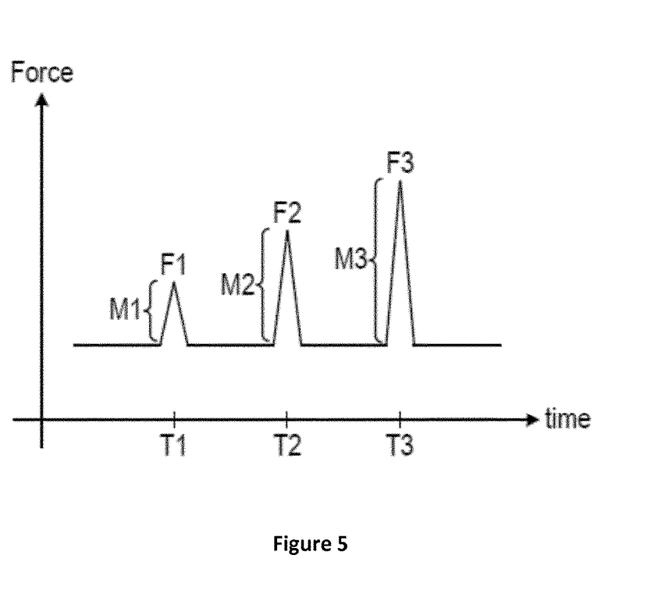
FIG. 5 is a graph of force versus time measured using an apparatus for processing food stuff according to an embodiment.

As mentioned above, the user interaction includes a force applied by a user to the apparatus 10. The graph in FIG. 5 illustrates measurements of force that can be measured by the sensor 130 of the apparatus 10 and subsequently used for determining whether a user input command has been input. The y-axis shows force magnitude and the x-axis shows time.

As shown in the graph of FIG. 5, at time T1 a first force F1 is measured by the sensor 130, at time T2 a second force F2 is measured by the sensor 130, and at time T3 a third force F3 is measured by the sensor 130. The first force F1 has a magnitude of M1, the second force F2 has a magnitude of M2, and the third force F3 has a magnitude of M3, where $M1<M_{t1}<M2<M_{t2}<M3$, $M_{t1}$ being a first force threshold and $M_{t2}$ being a second force threshold. The first force threshold $M_{t1}$ in this embodiment may be a threshold for determining whether a force applied by the user is intentional or accidental, and the second force threshold $M_{t2}$ may be a threshold for distinguishing between a first user input command and a second user input command.

In other words, if a measured force by the sensor 130 does not exceed the first predetermined threshold value $M_{t1}$, as is the case of the first force F1, the control unit 140 in this embodiment determines that no predetermined user interaction or a predetermined user interaction pattern corresponding to a user input command has been performed by the user. Force F1 is regarded as an accidental force which is not to be interpreted as an input.

If a measured force by the sensor 130 exceeds the first threshold value $M_{t1}$ but does not exceed the second threshold value $M_{t2}$, as is the case of the second force F2, then the control unit 140 in this embodiment determines that a first predetermined user interaction corresponding to a first user input command has been performed by the user. In this case, the first predetermined user interaction is a force with a magnitude between the first threshold value $M_{t1}$ and the second threshold value $M_{t2}$. For example, the first user input command corresponding to the first predetermined user interaction may be a command to change a time setting of the apparatus 10.

If a measured force by the sensor 130 exceeds the first threshold value $M_{t1}$ and the second threshold value $M_{t2}$, as is the case of the third force F3, then the control unit 140 in this embodiment determines that a second predetermined user interaction corresponding to a second user input command has been performed by the user. In this case, the second predetermined user interaction is a force with a magnitude larger than the second threshold value $M_{t2}$. For example, the second user input command corresponding to the second predetermined user interaction may be a command to change a program of the apparatus 10.

In other embodiments, different types of predetermined threshold(s) may be selected to correspond to other types of user input commands. For example, in some embodiments where the sensor 130 is configured to measure a time duration of a force applied by the user, one or more time duration thresholds may be used as predetermined user interactions.

Figure 6:
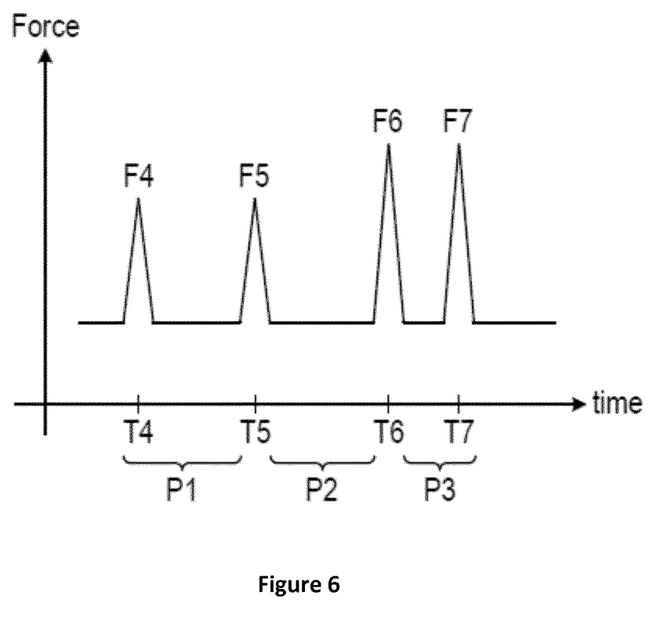
FIG. 6 is a graph of force versus time measured using an apparatus for processing food stuff according to an embodiment.

The graph in FIG. 6 illustrates different types of force patterns that can be identified by the control unit 140 of the apparatus 10 and subsequently used for determining whether a predetermined user interaction pattern corresponding to a user input command has been performed by a user, according to the invention. The y-axis shows force magnitude and the x-axis shows time.

As shown in the graph of FIG. 6, the sensor 130 measures at time T4 a fourth force F4, at time T5 a fifth force F5, at time T6 a sixth force F6, and at time T7 a seventh force F7. The forces F4, F5, F6, and F7 may be similar in magnitude or differ in magnitude, the latter being illustrated in FIG. 6. It is presumed that the forces F4, F5, F6, and F7 are all intentional forces applied by the user, and this may be determined by the control unit 140 by comparing the magnitude of each of these forces against a predetermined threshold value as described in relation to FIG. 5.

In this embodiment, the sensor 130 is configured to measure a time period between an applied force and a consecutive applied force. Therefore, a first time period P1 between T4 and T5, a second time period P2 between T5 and T6, a third time period P3 between T6 and T7 are respectively measured by the sensor 130.

These measured time periods P1, P2, P3 are each compared against a first time threshold $P_t$ by the control unit 140 so as to determine whether a predetermined user interaction pattern corresponding to a user input command has been performed by the user. In this embodiment, $P2>P1>P_t>P3$, where $P_t$ is the first time threshold. In other words, only the third time period P3 between T6 and T7 is shorter than the first time threshold, and the sixth and seventh forces F6 and F7 corresponding to the third time period P3 are therefore determined collectively as a "double-push" while the fourth force F4 and the fifth force F5 are determined individually as "single pushes". In this embodiment, a "single push" is a first predetermined user interaction pattern while a "double push" is a second predetermined user interaction pattern. In some embodiments, the first predetermined user interaction pattern may correspond to a first user input command while the second predetermined user interaction pattern may correspond to a second user input command. For example, in some embodiments, when the user performs a "single push" at the apparatus 10 the control unit 140 can identify such user interaction as a user input command to change a speed setting to the apparatus 10 and when the user performs a "double push at the apparatus" the control unit 140 can identify such user interaction as a user input command to power on/off the apparatus 10.

In other embodiments, different types of predetermined threshold(s) may be selected to correspond to other types of user input commands. For example, in some embodiments where the sensor 130 is configured to measure a magnitude of a force applied by the user, one or more predetermined force thresholds may be used as an alternative to or in addition to time thresholds as predetermined user interaction patterns.

The invention as described above involves monitoring a force applied. This force may be used to detect lid closure, or to provide a weight measurement of the food, as possible operating parameters that are thereby monitored. In addition, the force measurement is used to monitor a user interaction, when a user applies a force to, e.g. presses on, the apparatus.

However, in more general terms, the concept of the invention may be defined more broadly as an apparatus for processing food stuff comprising:

a container for receiving a food stuff;
a food processing unit for processing the food stuff in the container;
a sensor for measuring an operation parameter; and
a control unit for operating the food processing unit based on measurements received from the sensor, wherein the sensor is further configured to measure an interaction with the apparatus by a user, and wherein the control unit is configured to receive measurements of this user interaction from the sensor; and to process the received measurements to determine if a predetermined user interaction or a predetermined user interaction pattern corresponding to a user input command has been performed by the user.

The sensor has a purpose other than for determining a user interaction. In the implementations described above, the operation parameter measured by the sensor is a force, in particular a downward force. This purpose of the sensor, other than for determining a user interaction, may then be to detect lid closure or to preform food weight measurement.

However, other options are possible within the general concept underlying the invention but not claimed. The operation parameter may comprise any monitoring function which gives information about the operation of the apparatus. For example, instead of a force sensor such as a weight sensor as described above, the sensor may be a temperature sensor, an optical sensor, a capacitive sensor, a speed sensor or an acceleration sensor. The sensor may be used for measuring any related operation parameter, for instance a temperature of the food stuff and/or inside the container, a cutting speed of the food processing unit, etc. This information may be used by the control unit for operating the food processing unit. According to the general concept, the sensor may further advantageously be used to detect an interaction with the apparatus by a user. This information may then be used by the control unit to identify a user input command from the user.

Depending on the type of sensor available in the apparatus, the interaction by a user may take on different forms. For instance, in the examples already discussed above in accordance with the invention as claimed, the interaction by the user is a predetermined force or force pattern exerted by the user on a part of the apparatus (other than a user interface), e.g. on a lid or door of the apparatus. Said force may have a certain magnitude and/or duration. This type of interaction may be detected for instance by a force sensor such as a weight sensor in the apparatus.

In some other examples within the scope of the invention, the interaction by a user may be the changing of an orientation of a component of the apparatus, such as for instance the opening or closing of a drawer or a covering element of the container or apparatus, such as a lid or door, to confine the food stuff within. This type of interaction may also be detected for instance by a force sensor or weight sensor, in accordance with the invention. Alternatively, and within the general concept underlying the invention, this orientation change may be detected by a different sensor such as a temperature sensor if the opening or closing of the lid or door causes a measurable temperature change within the container or apparatus. Alternatively, it may be detected by an optical sensor, a capacitive sensor, or a motion sensor (speed sensor or acceleration sensor). In all cases, the control unit may be configured to process the received measurements of the respective sensors, to determine if a predetermined user interaction corresponding to opening or closing of the covering element has been performed by the user.

In some examples, the interaction by the user may be the changing of the set-up of the apparatus, such as for instance the placing of the container in or removal from the apparatus, or the changing of a tool of the food processing unit. This type of interaction may respectively be detected by a force sensor such as a weight sensor in accordance with the invention, or an optical sensor, a capacitive sensor, a speed sensor or an acceleration sensor in accordance with the general concept underlying the invention.

In some examples, the interaction by the user may be the adding or removing of ingredients in the container. This type of interaction may also for instance be detected by a force sensor such as a weight sensor, or also by an optical sensor or a temperature sensor.

In some examples in accordance with the general concept underlying the invention, the interaction by the user may include the presence of his hand at or near the apparatus. This type of interaction may for instance be detected by an optical sensor.

Thus, there are various options to enable an apparatus that can be operated in a simple and intuitive way, without the need for a conventional user interface (although such an interface may, of course, still be included in the apparatus as well, e.g. for entering more complex user input commands).

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus for processing food stuff comprising:
   a container for receiving a food stuff;
   a food processing unit for processing the food stuff in the container;
   a force sensor for measuring an operation parameter; and
   a control unit for operating the food processing unit based on measurements received from the force sensor,
   wherein the force sensor is configured to further measure, in addition to the operating parameter:
   an interaction with the apparatus by a user when the user applies a force on the apparatus;
   wherein the control unit is configured to:
   receive measurements of the user interaction from the force sensor; and
   process the received measurements to:
   determine if a predetermined user interaction or a predetermined user interaction pattern corresponding to a user input command has been performed by the user; and
   control the food processing unit in dependence on the determined user input command.

2. The apparatus according to claim 1, wherein the force sensor comprises a weight sensor and the operating parameter comprises a food weight.

3. The apparatus according to claim 1, wherein the force sensor comprises a lid closure sensor, and the operating parameter comprises a lid closure condition.

4. The apparatus according to claim 1, wherein processing the received measurements comprises matching the received measurements with a predetermined user interaction or a predetermined user interaction pattern to identify a user input command corresponding to the predetermined user interaction or predetermined user interaction pattern.

5. The apparatus according to claim 4, wherein matching the received measurements with a predetermined user interaction or a predetermined user interaction pattern comprises determining whether the measurements exceed a predetermined threshold value.

6. The apparatus according to claim 1, wherein the user input command corresponds to an operation to be performed by at least one of the control unit, the apparatus, and an external device.

7. The apparatus according to claim 6, wherein the operation comprises at least one of: powering on/off the apparatus; changing an operation parameter of the apparatus such as for instance a time setting, a temperature setting, a speed setting; changing a program of the apparatus; proceeding to a next step in a program or a user cooking guide; pausing or restarting an operation; adding or altering food ingredients, and confirming presence of a user.

8. The apparatus according to claim 1, further comprising a base unit for supporting the container, wherein the sensor is integrated in the base unit or between the base unit and the container.

9. The apparatus according to claim 1, wherein the control unit is configured to process the received measurements to determine a weight of the food stuff in the container.

10. A system comprising the apparatus as claimed in claim 1, further comprising an external device, wherein the external device comprises a control unit and a communication unit, and the communication unit of the external device is configured to receive the user input command, and the control unit of the external device is arranged to perform an operation at the external device based on the received user input command from the apparatus.

11. A method of operating an apparatus for processing food stuff, the method comprises:
   measuring an interaction with the apparatus by a user, using a force sensor in the apparatus;
   measuring, the force sensor, an operation parameter;
   receiving, in a control unit of the apparatus, measurements of the user interaction when the user applies a force on the apparatus;
   processing in a control unit of the apparatus, the received measurements to determine if a determined user interaction or a predetermined user interaction pattern corresponding to a user input command has been performed by the user; and
   controlling the food processing unit in dependence on the determined user input command.

12. The method according to claim 11, wherein processing the received measurements comprises matching, in the control unit of the apparatus, the received measurements with a predetermined user interaction or a predetermined user interaction pattern to identify a user input command corresponding to the predetermined user interaction or predetermined user interaction pattern.

13. The method according to claim 11, wherein the user input command corresponds to an operation to be performed by at least one of the control unit, the apparatus, and an external device.

14. A computer program product comprising a computer readable medium having computer readable code embodied therein, the computer readable code being configured such that, on execution by a suitable computer, processor or control unit, the computer, processor or control unit is caused to perform the method of claim 11.

* * * * *